Feb. 28, 1956 C. H. WEBBER 2,736,335
TAPPING AND CUTOFF CONNECTION TO PLASTIC FLUID PRESSURE MAIN
Filed March 23, 1953 2 Sheets-Sheet 1
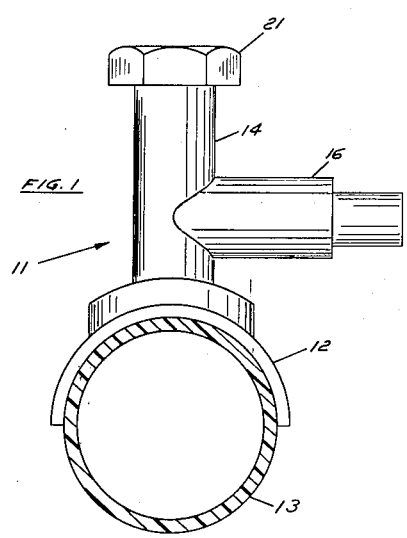
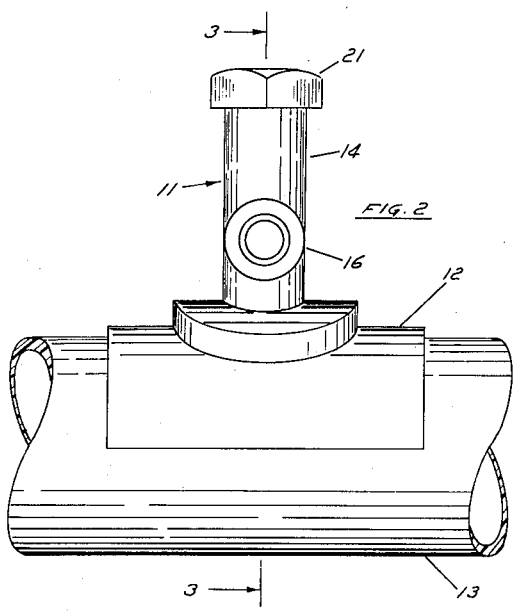
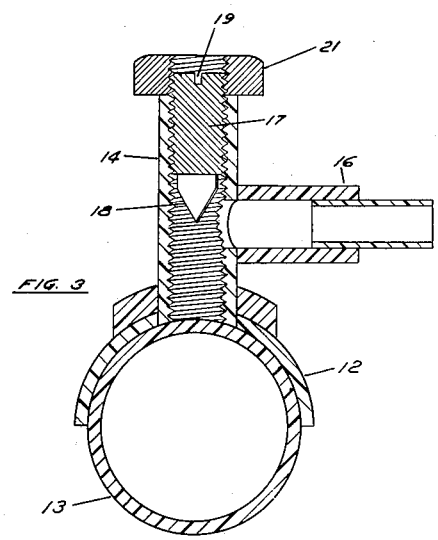
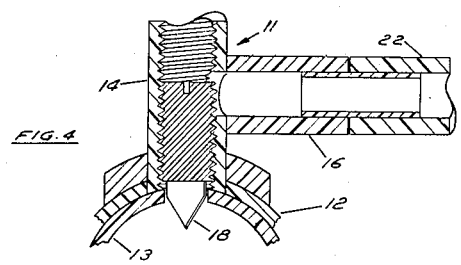
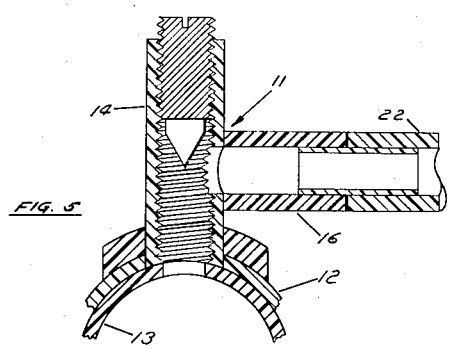
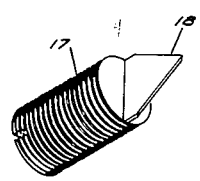
INVENTOR.
CLAUDE H. WEBBER
BY
John J. McLaughlin Feb. 28, 1956 C. H. WEBBER 2,736,335
TAPPING AND CUTOFF CONNECTION TO PLASTIC FLUID PRESSURE MAIN
Filed March 23, 1953 2 Sheets-Sheet 2
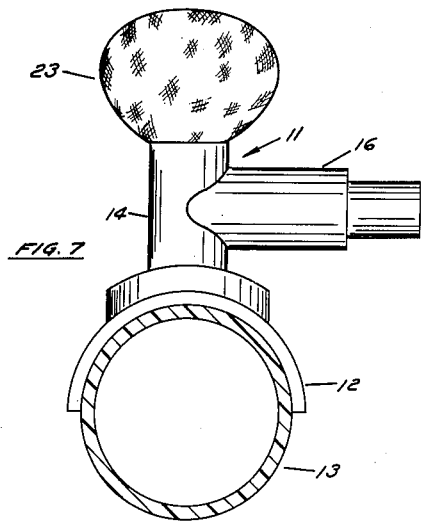
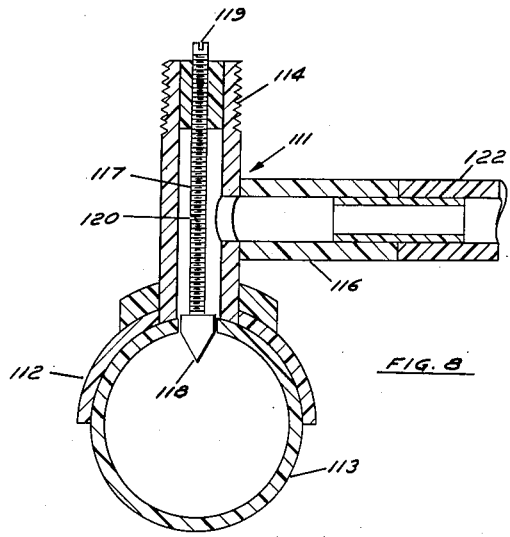
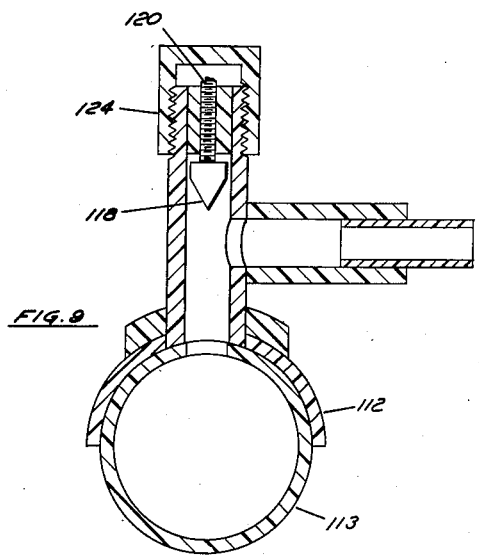
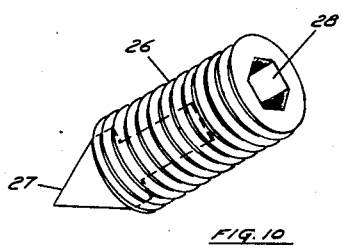
INVENTOR.
CLAUDE H. WEBBER
BY

2,736,335

TAPPING AND CUTOFF CONNECTION TO PLASTIC FLUID PRESSURE MAIN

Claude H. Webber, Tucson, Ariz.

Application March 23, 1953, Serial No. 344,101

3 Claims. (Cl. 137—318)

My invention relates in general to connections to plastic fluid pressure mains. It relates more in particular to means for tapping a service line into a plastic main carrying fluid under pressure, for example, gas pressure.

Plastic delivery mains have come into use in gas distribution systems. Conventional means for attaching service lines to plastic mains cannot be employed. Manufacturers of the plastic mains have produced and offered to the trade various coupling devices, all of which I have found unsatisfactory in actual practice, principally because at some time in the course of attachment it is necessary either to discontinue the flow of gas in the main or to operate under conditions that extensive gas leakage will occur and workmen are required to make the necessary attachments in an atmosphere heavily laden with gas.

The principal object of my invention is the provision of improved means for attaching service lines and the like to plastic mains carrying gaseous fluid under pressure.

Another object of my invention is the provision of a connecting fixture having a built-in expendable element for cutting a service opening in a plastic main.

Still another object of my invention is the provision of a connecting fixture with a built-in cutting element which seals off a service line during the cutting operation.

Other objects and specific features of the invention will be brought out in connection with the following detailed description taken with the accompanying drawings, wherein:

Fig. 1 is an elevational view showing one form of my invention, a gas main to which the device is attached being shown in transverse section;

Fig. 2 is an elevational view looking from the right-hand side of Fig. 1;

Fig. 3 is a sectional view taken on the line 3—3 of Fig. 2 looking in the direction of the arrows;

Figs. 4 and 5 are fragmentary sectional views similar to Fig. 3, showing successive steps in the operation of the device;

Fig. 6 is a perspective view of a valve device, showing a cutter forming a part thereof;

Fig. 7 is an elevational view, partly in section, showing the final step of preparing the device before it is covered with earth after the attaching operation has been completed;

Figs. 8 and 9 are sectional views showing a modification; and

Fig. 10 is a perspective view showing a modified type of cutting member.

Referring now to Figs. 1 through 7, a plastic connector body generally indicated by the reference character 11 is provided with a saddle 12 for attachment to a main 13, by suitably wetting the surfaces with an adhesive comprising a solvent for the plastic and holding the parts together until the plastic bond has set. My invention is not concerned with the particular plastic materials used for the main and plastic body connector, nor with the specific type of plastic welding operation used for attachment. The plastic connector body 11 has a tubular extension 14 which in the usual attaching operation will project vertically upwardly, or in any case perpendicularly to the longitudinal axis of the main 13. A tubular offset 16 is provided to which a service line may be attached.

Within the tubular extension 14 I provide an elongated threaded cutting member 17 with a cutter 18 at the bottom thereof. In the form of the invention shown in Figs. 1–7, the cutting member 17 is in the form of a plug valve large enough to completely fill the inside threaded surface of the tubular extension 14 and long enough to close off the tubular offset 16 when the cutter 18 is in a position to engage the main 13, as shown particularly in Fig. 4.

A tool opening, suitably a slot 19, is provided in the upper end of the member 17 so that it may be turned with a common type of tool. An ordinary hex nut 21 is provided to fit the cutting member 17 when it is partly projecting above the tubular extension 14.

The cutting member 17 is preferably produced from ordinary cold rolled or other inexpensive steel but may, if desired, be formed from a corrosion-resistant metal such as stainless steel, bronze or brass. I have found that the plastic may be cut readily if this cutter is merely in the form of a flat tapered body like a spear head with its side edges sharpened, and that the cutting action is sufficiently rapid that as it is advanced by the action of ordinary screw threads it will cut through the plastic material without deleterious tearing or breaking. In this way a relatively very inexpensive cutter may be formed and it may be permitted to remain in place—in other words, be expendable—and still introduce only a negligible cost factor.

The operation of the connector of my invention is simple and expeditious. The first step is to apply the body 11 in position in the manner shown in the drawings. The connector body may be attached by means of any common adhesive containing a solvent for the plastic used and holding the parts together until the resulting plastic weld has set. The nut 21 is then removed, and the member 17 is screwed downwardly until it cuts through the wall of the main 13 as shown in Fig. 4. In this position, little or no gas will escape through the offset 16 even though the main 13 is filled with gas under pressure. At any desired time a service line 22 is attached in a suitable manner to the offset 16. The cutting member 17 is then screwed upwardly to the position shown in Fig. 5. A small amount of solvent is then placed around the upper top edge of the tubular extension 14, and the nut 21 is attached and screwed up tightly against the top edge of the tubular extension. In applying the nut 21, a tool may be employed if necessary to prevent the cutting member 17 from turning. Suitable protecting tape 23 may then be placed entirely around the nut 21 and upper end of the tubular body, as shown in Fig. 6, before the connector is covered with earth.

In the modification shown in Figs. 8 and 9, the same numerals are employed as in the first-described embodiment to identify like parts, with the prefix 1 to identify modification. In this modification the service line 122 must be first attached in position because the elongated member 117 is not so constructed and arranged as to valve off the offset 116. The cutting member 117, however, has a saw kerf 120 intermediate its ends, but still has sufficient torsional strength to cause the cutter 118 to form a hole in the main 113 when the parts are as indicated in Fig. 8. After the cutting operation has been completed, the elongated body 117 is threaded upwardly until the saw kerf 120 is above the top edge of the tubular body. The member 117 is then broken in this location and a plastic or like cap 124 is threaded into position as shown in Fig. 10 to provide a complete seal. It will be understood that the cutting member 117 in this instance must be assembled in position before the entire body 111 is sealed against the main 113. Instead of providing the saw kerf 120, the member 117 may be cut off with a hack saw before applying cap 124.

In Fig. 10 I show a modified form of cutting member in which a threaded plastic plug 26 has a metal cuting element 27 molded into its lower end and a tool opening 28 in its upper end. Such a cutting member may be substituted bodily for the member 17 of Fig. 3. Such structure permits the use of only a small portion of metal for the actual cutting element. Also, while absolute sealing is not required between the cutting member and inside wall of the extension 14, this structure facilitates improvement of the seal, as by application of a rubber-like solution to the threads and the like.

I have described two embodiments of my invention in detail, but the scope of the invention is defined by the claims.

I claim:

1. In a connection of the character described, the combination comprising: a plastic main; a combined tapping and service plastic T having a through bore, a lateral outlet, and a saddle on one end of said T solvent-welded to said main with said T positioned substantially radially thereon, said bore being of uniform diameter and threaded throughout its length; and a plug threaded into said bore from the other end of said T with the inner end of said plug being provided with cutting means for advancing into engagement with and cutting a hole through said main on rotation of said member, the length of the bore section extending between said outlet and said T other end being sufficient to receive said plug for blocking said bore section while permitting unobstructed flow from said main to said outlet after a hole has been cut in said main by said cutting means, and the length of said cutting means being less than the length of the bore section extending between said outlet and said T one end, whereby said plug blocks communication between said lateral outlet and said main immediately when the hole is cut in the latter.

2. For a connection of the character described, the combination comprising: a combined tapping and service plastic T having a through bore, a lateral outlet, and a saddle on one end of said T for solvent-welding to a plastic main to position said T substantially radially thereon, said bore being of uniform diameter and threaded throughout its length; and a plug threaded into said bore from the other end of said T with the inner end of said plug being provided with cutting means for advancing into engagement with and cutting a hole through said main on rotation of said member, the length of the bore section extending between said outlet and said T other end being sufficient to receive said plug for blocking said bore section while permitting unobstructed flow from the main to said outlet after a hole has been cut in said main by said cutting means, and the length of said cutting means being less than the length of the bore section extending between said lateral outlet and said T one end, whereby said plug blocks communication between said outlet and said main immedately when the hole has been cut in the latter.

3. For a connection of the character described, the combination comprising: a combined tapping and service plastic T having a through bore of uniform diameter, a lateral outlet, and a saddle on one end of said T for solvent-welding to a plastic main to position said T substantially radially thereon; an interior thread in said bore extending from end to end thereof; and a plug-like member engaged with said thread and having means on one end thereof for advancing into engagement with and cutting a hole through said main of less diameter than the crest diameter of said thread on rotation of said member, the length of the bore section extending between said outlet and the other end of said T being sufficient to receive said plug-like member for blocking said bore section while permitting unobstructed flow from the main to said outlet after a hole has been cut in the main by said cutting means, and the length of said cutting means being less than that of the bore section extending between said outlet and said T one end to block communication between said outlet and the main immediately when the hole is cut in the latter.

References Cited in the file of this patent

UNITED STATES PATENTS

| 1,039,576 | Mueller et al. | Sept. 24, 1912 |
| 2,498,831 | Veitch | Feb. 28, 1950 |
| 2,608,989 | McDonald | Sept. 2, 1952 |

FOREIGN PATENTS

| 1,457 | Great Britain | May 14, 1872 |
| 79,846 | Germany | Mar. 1, 1895 |
| 505,046 | Great Britain | May 4, 1939 |